2 Sheets—Sheet 1.
R. IMLAY.
Car Truck.
No. 389.
Patented Sept. 21, 1837.
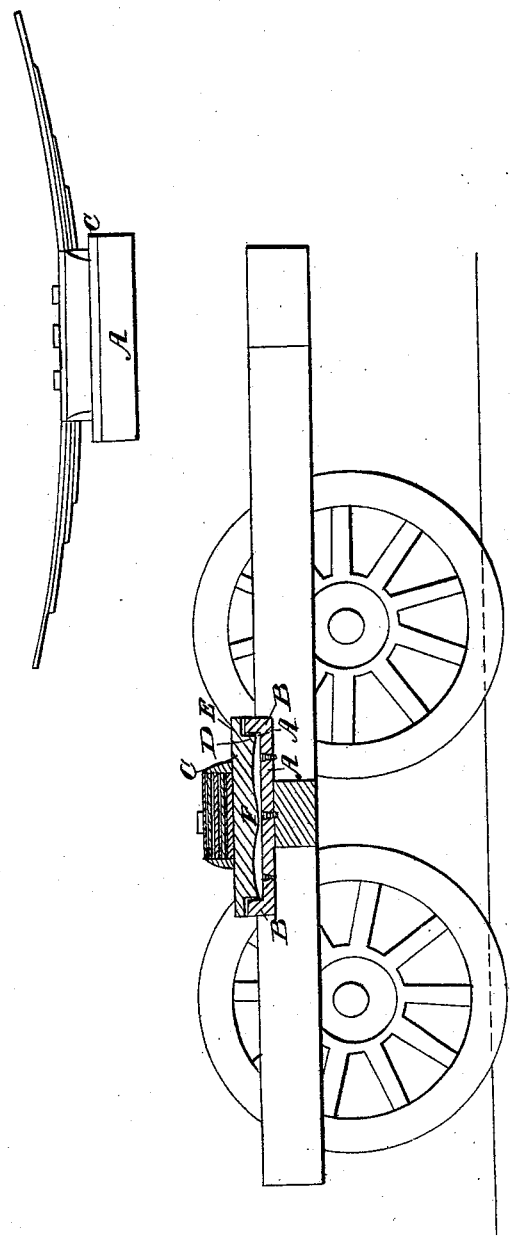

2 Sheets—Sheet 2.
R. IMLAY.
Car Truck.
No. 389.
Patented Sept. 21, 1837.
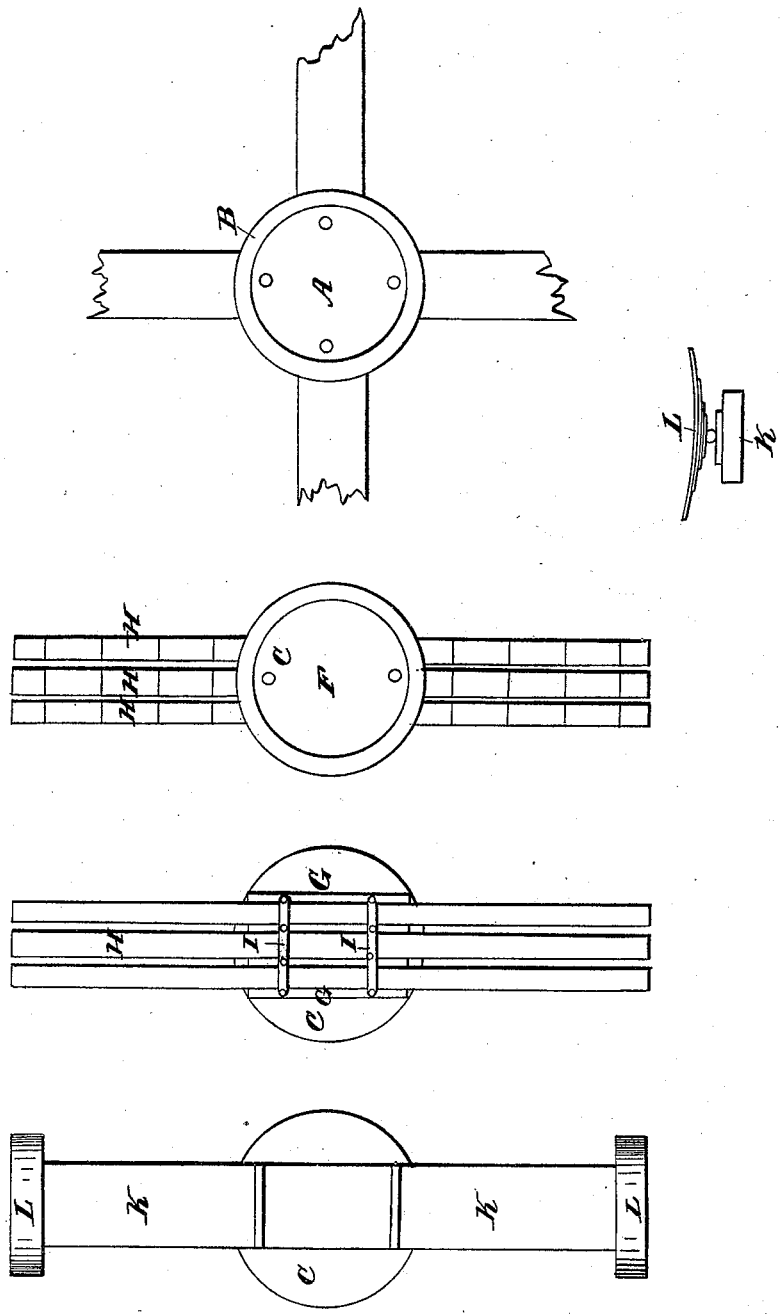

UNITED STATES PATENT OFFICE.

RICHARD IMLAY, OF PHILADELPHIA, PENNSYLVANIA.

MODE OF SUPPORTING THE BODIES OF RAILROAD-CARS AND CARRIAGES.

Specification of Letters Patent No. 389, dated September 21, 1837.

*To all whom it may concern:*

Be it known that I, RICHARD IMLAY, of the city and county of Philadelphia and State of Pennsylvania, have invented a new and Improved Mode of Supporting the Bodies of Eight-Wheeled Railroad-Cars Upon Springs; and I do hereby declare that the following is a full and exact description.

The nature of my invention consists in placing two cylindrical plates, one above the other, in the middle of the carriage at each end of the car, so that the under one being confined to the frame of the carriage, the springs to the upper one, and they connected to the body of the car, thereby allows of any movement in turning curves, and also a complete rotary movement if desired.

To enable others skilled in the art to make and use my invention, I will proceed to describe its construction and operation.

I make a hollow round cast-iron bed-plate A, two feet in diameter, more or less, flat upon the bottom, and of sufficient thickness for strength to support the weight which it is intended to sustain. It has an upright rim B projecting upward, all around its periphery two inches high more or less and about one inch thick. The bottom of said bed plate is turned upon the inside flat or level, and the top edge of the rim horizontal and true and also its inner periphery vertical and smooth. I then make a top plate C of the same diameter, with a rim D projecting downward, of nearly the same thickness as that of the bed plate rim, but not quite so deep; this rim is turned into the exterior rim so as to make nearly a close fit; it has a flanch E projecting sufficiently to cover the exterior rim of the bed plate, the under side of which is turned smooth and flat to correspond to the top edge of the under rim; the interior of said top plate is made convex, projecting downward from the rim toward its center and about one sixteenth of an inch deeper, in the finish, than the rim of the bed plate, and is all turned smooth upon the inside, and its center F is made to bear upon the center of the bed plate upon a surface of four inches in diameter, more or less, and upon this center the whole weight of the car, body, and load rest; and at the same time allows the bed plate to vibrate or revolve under said cap plate sufficiently for all the curves and crossings upon the road, or to make an entire revolution if desired. The said bed plate is made fast upon the center of the carriage by four bolts passing through the bed plate, the center transverse rail or beam, and the longitudinal center rail of the carriage and secured by nuts underneath; said bolt-heads are counter sunk into said bed-plate flush and are made oil tight, so that said bed plate may always contain oil for its preservation and easement to its vibration or movement; the said center of the cap plate being made a grain deeper than the height of the exterior rim, the flanch of the top plate is thus left free from the rim of the bed plate, except when the cap is out of level with the bed, at which time the rims jamb or grip each other, and thus prevent its being tilted out of the bed. The top of the cap-plate I make concave, with four ribs G three quarters of an inch thick, more or less, parallel to and equidistant from each other extending across the plate and projecting upward about three inches; between these ribs I place three steel springs H transversely with the car body and on which it rests; these springs are secured to the top plate only, and that by screw bolts and clips I, the heads of which bolts are countersunk into the under surface of the plate flush and pass up through the ribs; cast iron chairs or pockets are fastened to the under side of each of the outside bed rails or sills of the car, and in these chairs the ends of the springs take their bearing and sustain all the weight of the load.

In some instances, (especially for burthen cars), I fasten a strong transverse beam or bolster K by clip bolts or otherwise, to the said top plate, in which case, the aforesaid ribs are left off, except the two outside ones, and between which the said bolster is secured to the plate; this bolster may be made of strong wood, or iron as preferred; upon each end of this bolster, I fasten the steel springs L, and which of course range across it and lay longitudinally with the body, and the body rests upon four sets of these springs, spring chairs or pockets being fastened to the under side of the outside longitudinal bed sills or rails of the body, as before described. By having a vibrating cylinder under each end of the car, the springs connecting with the body and the top plate alone, through the medium of the aforesaid chairs, the carriages being connected only to the bed plates, they are left free to vibrate in any direction required under the body and yet the body and carriages are by this means so connected as to be entirely safe and free in all its necessary actions. In this manner, bodies of any dimensions desired, that would be safe and useful, can be mounted upon springs and thereby remove the jar and disagreeable noise which common cars of a similar size are liable to, indeed it is by far, more quiet and agreeable to ride in, than any single carriage body however well hung, that I have seen or built.

What I claim as my invention, is—

The application of the vibrating cylinder plates as set forth in the specification, whereby to support all kinds of eight wheeled railroad carriage bodies upon springs, or in any other form or size whereby the same principle is used to obtain the same object.

RICHD. IMLAY.

Witnesses:
ANDREW GEYER,
JOHN N. BAUERSACH.